United States Patent [19]

Cato et al.

[11] Patent Number: 5,255,268
[45] Date of Patent: Oct. 19, 1993

[54] DATA DISTRIBUTION NETWORK WITH IMPROVED BROADCAST FEATURE

[75] Inventors: Robert T. Cato; David R. Hughes, both of Raleigh; Carl J. Moreschi, Franklinton; James M. White, Raleigh, all of N.C.

[73] Assignee: International Business, Armonk, N.Y.

[21] Appl. No.: 830,824

[22] Filed: Feb. 4, 1992

[51] Int. Cl.$^5$ .............................................. H04J 3/24
[52] U.S. Cl. .................................. 370/94.1; 370/85.13; 371/32
[58] Field of Search ................. 370/85.13, 85.14, 94.1; 371/32

[56] References Cited

U.S. PATENT DOCUMENTS

| | | | |
|---|---|---|---|
| 4,715,030 | 12/1987 | Koch et al. | 370/85.13 |
| 4,807,224 | 2/1989 | Naron et al. | 371/32 |
| 4,941,089 | 7/1990 | Fischer | 370/85.13 |
| 5,134,610 | 7/1992 | Shand et al. | 370/85.13 |

Primary Examiner—Douglas W. Olms
Assistant Examiner—Min Jung
Attorney, Agent, or Firm—Joscelyn G. Cockburn

[57] ABSTRACT

A data source on a main local area network (LAN) transmits broadcast messages via bridges to remote stations. A ring buffer in a bridge on the main LAN buffers a selected number of packets received from the data source. When the main bridge on the main LAN receives a "Lost Frame Message" from a remote bridge, not on the main LAN, the main bridge backs up to the address of the lost packet in the ring buffer, and retransmits the lost packet and then continues sequential transmission of subsequent packets. If buffer is, filled above a pre-set criteria, retransmission is slowed or stopped until buffer is mostly emptied.

10 Claims, 7 Drawing Sheets

FRAME FORMAT

DATA DISTRIBUTION NETWORK WITH IMPROVED BROADCAST FEATURE

BACKGROUND OF THE INVENTION

1. Field of the Invention

The invention relates to communications networks in general and in particular, to a device and a method for improving the reliability of broadcast data transmissions in such networks.

2. Prior Art

The proliferation of computers creates a need for more reliable and efficient communications networks to interconnect the computers. Prior art communications networks may be broadly classified into two types, namely; wired and wireless. Both types of communications networks provide the communications highway over which the computers or other attached devices exchange information.

In a wired communications network, the computers, terminals, workstations, etc., are interconnected via hardwired communications media. The communications media may include copper wire, fiber optics, etc. Also, the communications media and attached devices may be configured into a serial network, a star network, etc. Whether the network is configured as a serial star or any of the other known configurations depends, to a great extent, on the application to be practiced on the network.

In the wireless communications network, the attached devices are interconnected via wireless medium. The wireless medium may include radio frequency (RF), infrared light, etc. Like the wired communications networks, the wireless networks may be configured as a serial network, a star network or any of the other known configurations.

In addition to the physical structure, a protocol/architecture is required to ensure faithful delivery of the data between the interconnected devices. One of the conventional approaches is to assemble data into packets and "broadcast" the packets from one of the devices (called a controller) to other devices on the network. In the event that a packet is not received by a device, the device requests retransmission of the packet. U.S. Pat. No. 4,807,224 describes and shows a multicast data distribution system in which a data source assembles data and transmits the data through a communication node to a plurality of end users nodes. A device (called a recovery means) is connected to the communication node. The recovery means captures data which is transmitted from the data source and stores it in a ring buffer located in the recovery means. If an end user node does not receive a packet, it requests retransmission of the missing packet from the recovery means which provides the missing packet from its ring buffer or obtains it from the data source and retransmits it to the end user node.

SUMMARY OF THE PRESENT INVENTION

It is, therefore, the object of the present invention to provide a more efficient and reliable communications network than has heretofore been possible.

It is another object of the present invention to provide a protocol and architecture which allows a more efficient and reliable transmission of data on the network.

The above and other objects are achieved by providing a main bridging device with a ring buffer storage on a serially wired communications network to which a controller is connected. The bridging device captures all data packets transmitted by the controller and retransmits them through a wireless network or the power distribution system in a building to remote bridging devices which deliver the packets to attached terminals. If a terminal misses a packet, its associated remote bridging device sends a message with a unique format to request retransmission of the missing packet. On receiving the message, the main bridging device backs up to the location in the ring buffer whereat the missing packet is located and begins sequential transmission of data packets to the remote bridging unit. Due to the back up and retransmission techniques, a full size buffer is not required in the main or remote bridging units.

DETAILED DESCRIPTION OF THE PREFERRED EMBODIMENT

The invention to be described hereinafter can be used in any environment in which communication is required among a plurality of distributed units and a controlling device. It works well in point of sale (POS) computer systems used in department stores, supermarkets, etc. and as such, it will be described in that environment. However, this should not be construed as a limitation on the scope of the invention since it is well within the skill of one skilled in the art to make minor changes to the invention and expand its use into different types of communications environments.

Figure 1:
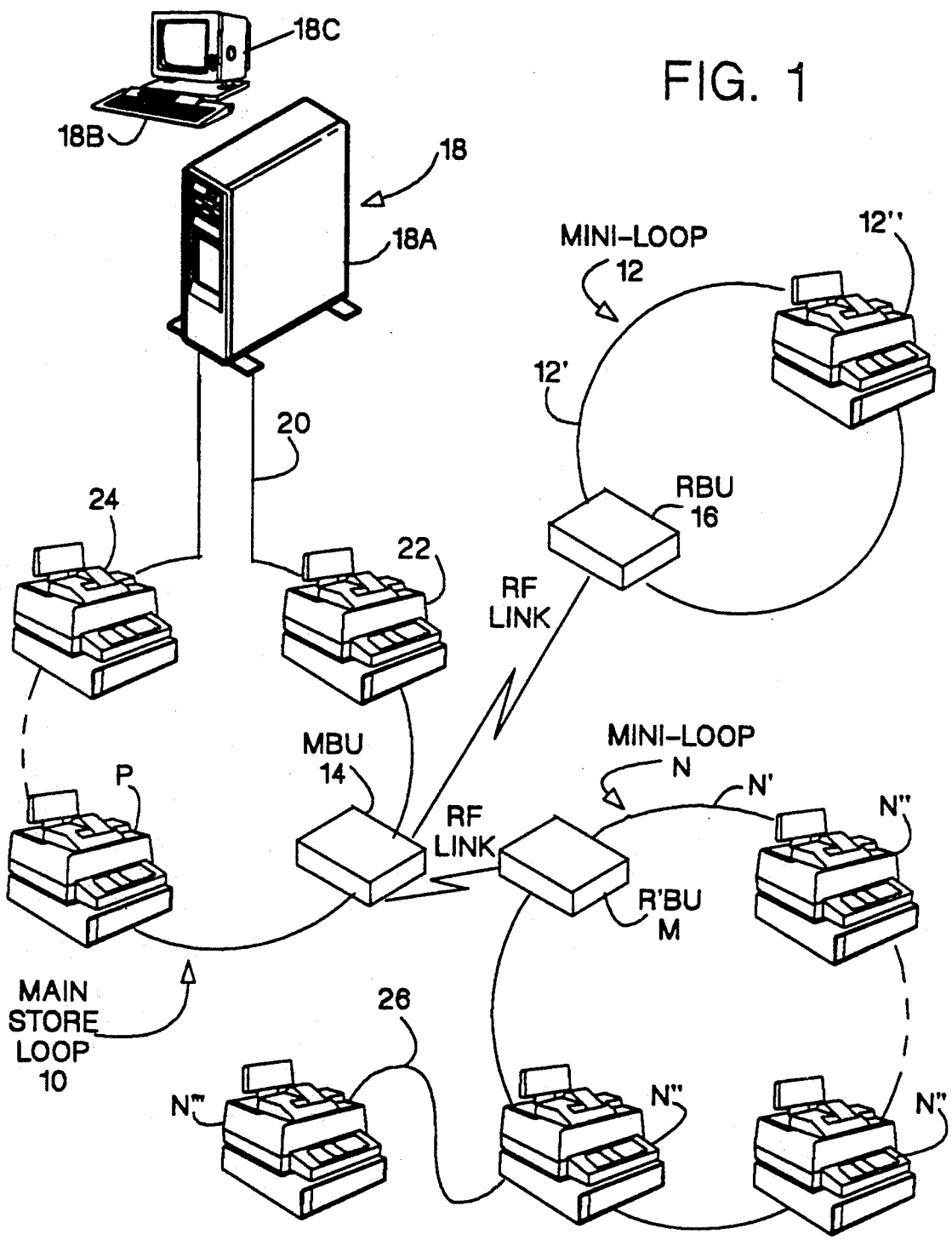
FIG. 1 shows an isometric view of a communications system according to the teachings of the present invention.

FIG. 1 shows a communications network comprising a main store loop 10 interconnected through radio frequency (RF) links to a plurality of mini loops 12 . . . N. Each RF link interconnects a main bridge unit 14 to one of a plurality of remote bridge units 16 . . . M. Standard RF technology could be used to effectuate transmission on any of the RF links or so-called spread spectrum technology could be used to effectuate the transmission. Regardless of the method used to effectuate transmission on the RF link, communications between the main store loop 10 and any of the mini loops is carried out via the main bridge unit and the respective remote bridge unit mounted on the mini loop. Preferably, the main store loop 10 and each of the mini loops are hard wired communications networks. The RF links form a wireless network interconnecting the wired networks.

Still referring to FIG. 1, the main store loop 10 includes a store controller 18 interconnected through loop (serial) communications media 20 to a plurality of terminal units 22, 24 ... P and main bridge unit 14. Preferably, the terminal units may be any type of electronic cash register such as the well known IBM 4683 terminals used in retail establishments. Since the use of these units are well known in the art, a detailed description of the structure will not be given. Suffice it to say that each of the unit has a keyboard in which an operator enters information, a printer for printing a customer receipt and a display on which the customer views information relative to a purchased item. Similarly, the store controller 18 includes a control unit 18A, a keyboard 18B and a display 18C. In the store environment, the store controller communicates with any of the terminals on the main loop via media 20. Communications on the media is unidirectional, as shown by the arrow 9, and a subset of the well known IBM SDLC protocol is used. Details of the IBM store loop and the SDLC protocol can be found in IBM Synchronous Data Link Control General Information Manual, GA27-3093, 4680 Store System Loop Interface and 4680 Store System Hardware/Software Interface Programming Information. These documents are publicly available and are incorporated herein by reference.

Still referring to FIG. 1, the Main Bridge Unit (MBU) 14 sits on the main loop and monitors all the messages that are on the loop and copies and transmits via the RF link packet designated for devices on the mini loop. Each of the mini loops (only two of which are shown in FIG. 1) is interconnected through a dedicated Remote Bridge Unit (RBU) to the main loop. In particular, mini loop 12 is comprised of communications media 12' to which a terminal 12" is interconnected. The mini loop 12 and its attached unit,,& interconnected through RBU 16 to the main store loop. The terrain is identical to the terminals on the main loop, therefore, a detailed description will not be given here. It should be noted that even though a single terminal 12" is shown on mini loop 12, in a practical configuration, several other terminal devices would be connected to the mini loop 12. Likewise, mini loop N includes a communications media N' interconnecting a plurality of terminals N". Each of the terminals N" are identical to the previously described terminal and, as such, details will not be given. The mini loop N is interconnected through a dedicated RBU M to the main store loop. A slave terminal N''' is connected via communications media 26 to one of the terminals N" on the mini loop N. This configuration enables a user to have more terminals connected to the store controller.

Figure 2:
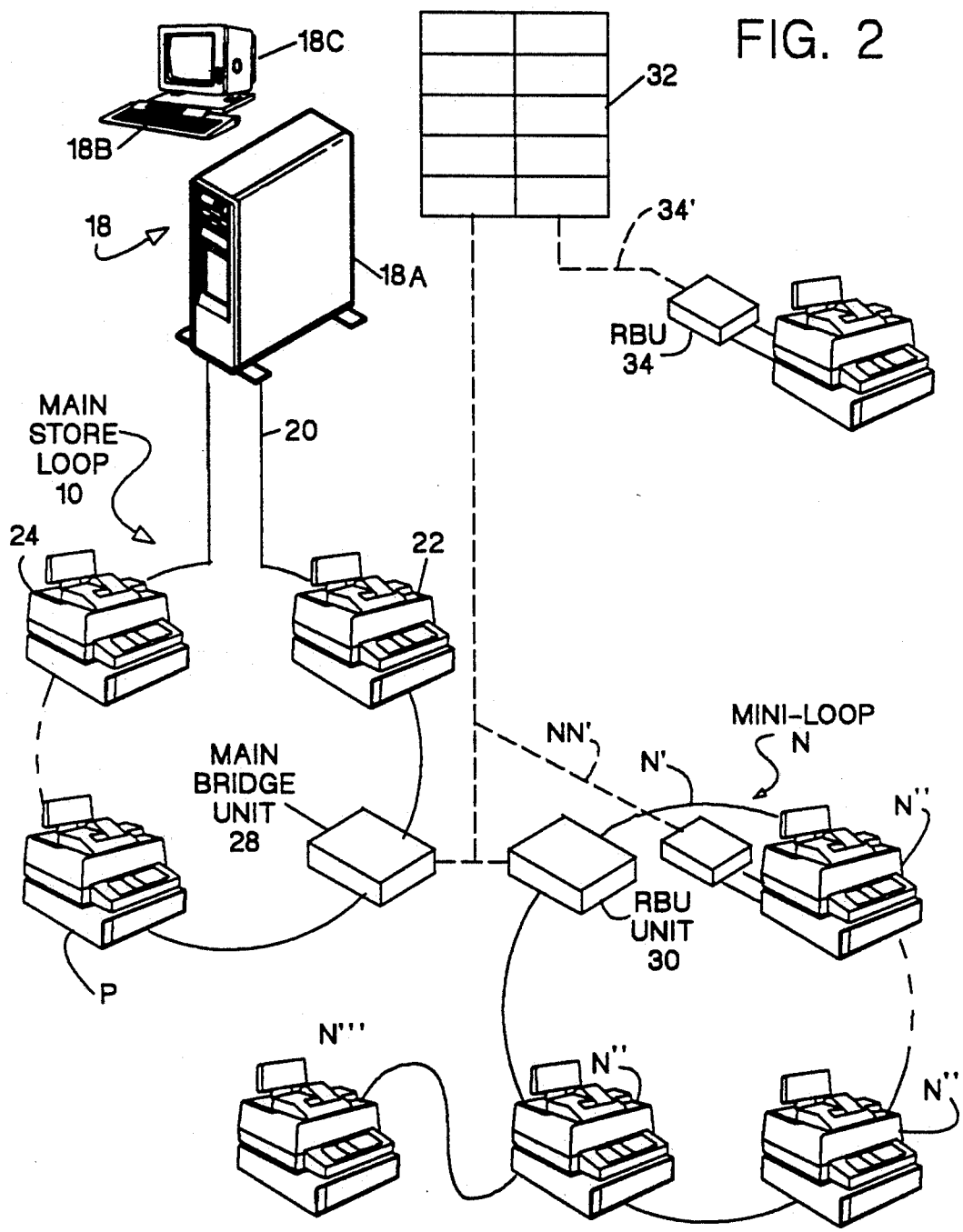
FIG. 2 shows an alternate embodiment in which the main and mini loops are interconnected via the power lines in a building.

FIG. 2 shows an alternate structure according to the teachings of the present invention. For brevity, units which are identical to units in FIG. 1 are identified by the same name and numerals. The main difference between the structure in FIG. 2 and the structure in FIG. 1 is that in FIG. 2 the communications between the main store loop and the mini loops are effectuated over the power distribution system. To this end, the main bridge unit 28 is connected to the breaker box 32 through power line 33. The remote bridge units 34 ... NN are connected to the breaker box via power line 34' ... NN'. The technology for transmitting information over power line is well known in the prior art and described in U.S. Pat. No. 4,815,106. Therefore, details of data transmission over power lines will not be given here. Suffice it to say that packets for the mini loops are collected by main bridge unit 28, formatted in accordance with the details of the invention to be given hereinafter and uses standard power line techniques to transmit the information to the remote bridge units.

Figure 3:
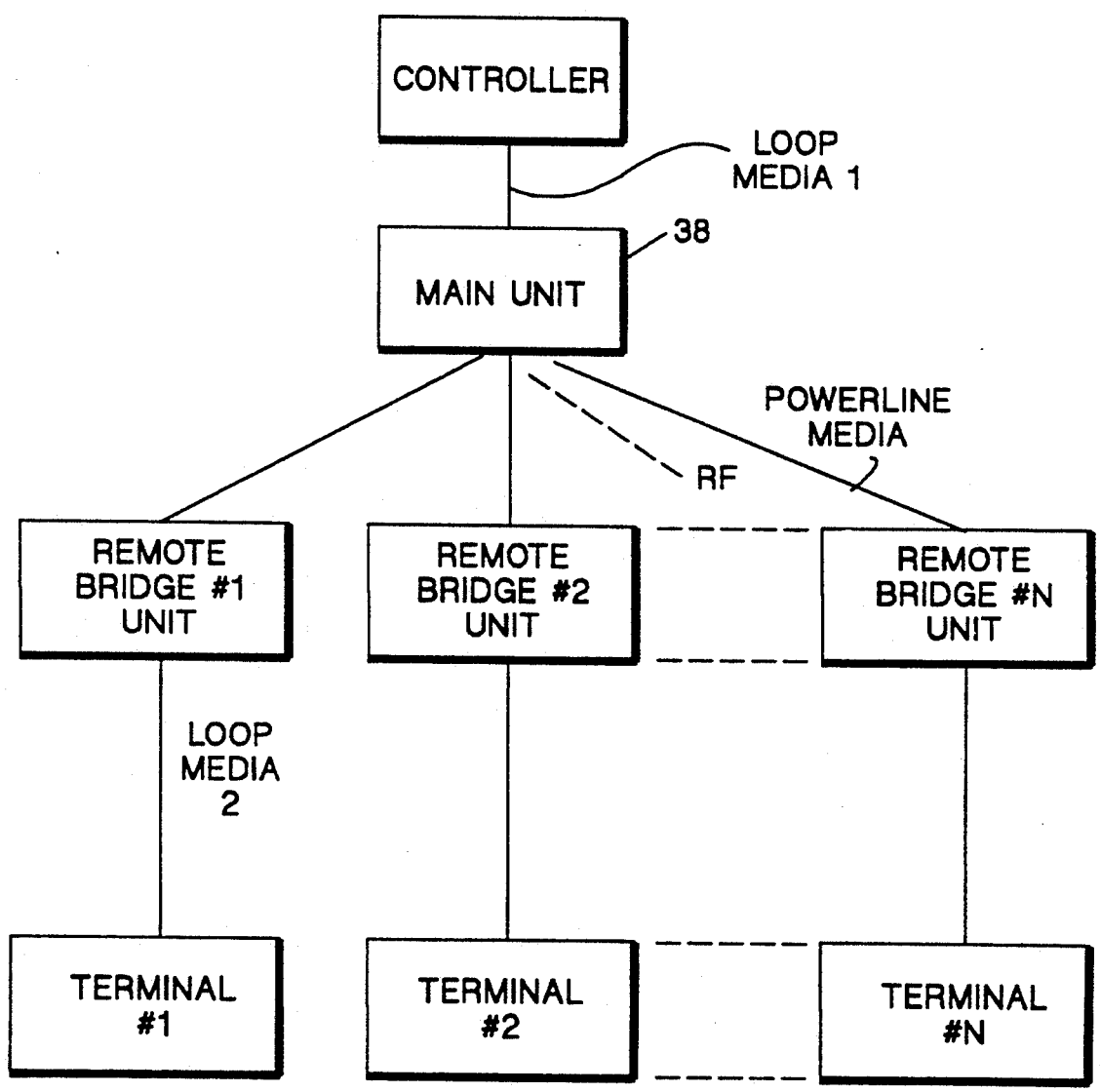
FIG. 3 shows another alternate embodiment in which the master bridge is linked through dedicated transmission links to remote mobile unit.

FIG. 3 shows a conceptual alternative embodiment according to the teaching of the present invention. In FIG. 3, only the critical elements of the communication network are shown. To this end, the controller 36 is coupled by a loop media 1 to a main bridge unit 38. As is obvious from the description of FIG. 1 and FIG. 2, other units such as point of sales terminals, not shown, would be attached to loop media 1. The main bridge unit 38 is coupled to a plurality of remote bridge units 1, 2, ... N by power line media, RF frequency, etc. Each of the remote bridge units is coupled over loop media 2 to different terminals identified by numeral 1, 2, ... N. The system in FIG. 3 is truly mobile in that a remote bridge unit with its attached terminal can move freely without the wired constrain of the system in FIGS. 1 and 2.

Figure 4:
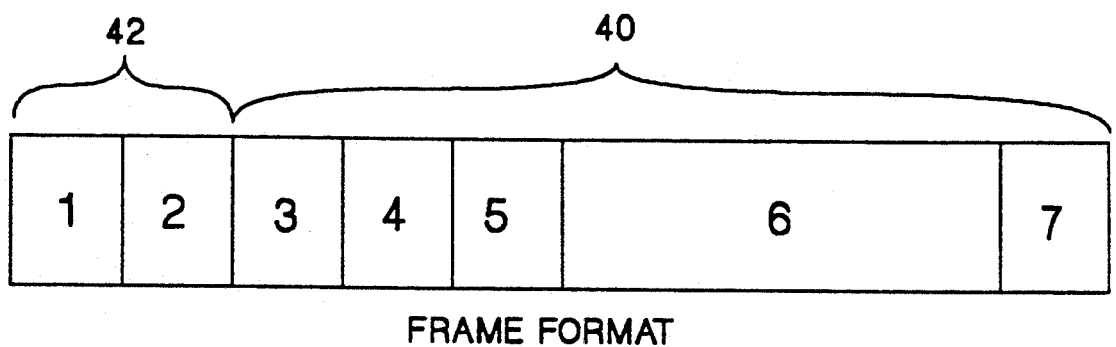
FIG. 4 shows a graphical representation of the frame format for transmitting information between the master bridge and a remote bridge.

FIG. 4 shows the frame format for communicating on the main store loops (FIGS. 1 and 2), loop media (FIG. 3) and mini loop (FIGS. 1 and 2) and loop media 2 (FIG. 3) and the interconnecting networks (be it power line RF, etc.). The section of the frame format labeled 40 is the well known SDLC frame format and is used for transmitting packets on the main and mini loops, respectively. Control header 42 is attached to section 40 and the entire frame format 40 and 42 is used for transmitting information between the main bridge unit and the remote bridge units. Table 1 below identifies the respective fields in the frame format.

TABLE I

| Field No. | Description | No. of Bytes |
|---|---|---|
| 1 | Identify Message Type | 1 |
| 2 | Bridge Control | 1 |
| 3 | Beginning Flag | 1 |
| 4 | Terminal Addr | 2 |
| 5 | Command Byte | 1 |
| 6 | Data with Sequence No. | Optional |
| 7 | End Flag | 1 |

With reference to the table the first column carries the field number, the second column describes the function which the field provides and the last column gives the number of bytes for the field. For example, the field number 1 identifies the message type and is 1 byte long. The field is part of the header 42 and is used by the bridge unit. In the preferred embodiment of the invention, if the value in this field is set to 00 (HEX), the data in the data field (identified by numeral 6 of the frame) is a normal loop message to be passed on through the bridge to the loop. If the header is set to 01 (HEX), the data is a broadcast load block with the first two byes of the data field being the sequence number. As will be explained subsequently, the sequence number is used by a remote device to identify when a packet of information is not received and is presumed to be lost. Finally, if all the bits in field 1 are set to 1 (that is, 255), the data is a bridge generated request not to be passed over the loop. The possible values (or setting for bits in the next byte (i.e., byte 2) is as follows:

A setting of 01 indicates that a mini loop cannot find a master bridge.

A setting of 02 means that a master bridge is alive. This is a message from a main bridge unit to Remote Bridge Units.

A setting of 03 means that a remote bridge with ID XXXX requests to use address NNNN. This is a message from a remote bridge unit to a main bridge unit.

A setting of 04 indicates a duplicate address message. This means that more than one remote bridge has the same address.

A setting of 05 represents a broadcast retransmit request message from a remote bridge unit to a main bridge unit.

Finally, a setting of 06 is a message indicating that address NNNN is already in use. Usually this message would be transmitted from a main bridge unit to a remote bridge unit with an outstanding request to use the NNNN address.

It should be noted that the settings 01 through 06 are exemplary and do not limit the scope of the invention.

As can be detected from the above description, certain packets of data transmitted from the store controller 18 are transmitted over the main loop through the main bridge unit and over the wireless network or power line to the remote bridge unit from which it is retransmitted to the appropriate terminal. Among the packets which are transmitted is a broadcast packet. Usually, this packet is destined for every terminal on the network. Information such as initial program load (IPL) data is transmitted from the controller as a broadcast packet. The store controller 18 is programmed so as to transmit data in 256K byte blocks, only. Often times when a packet is transmitted from the controller and retransmitted over the network which interconnects the main loop and the mini loop, a packet or packets of information are sometimes lost in the interconnecting network. This situation is even more prevalent since the interconnecting network is usually noisy and mutilates data as it is transmitted over the network. When a packet is lost or mutilated, the terminal on the mini loop requests the controller to resend the packet. However, since the controller only transmits large blocks of data, it takes a relatively long time period to retransmit a block and for the terminal to select the appropriate packet to be used. As a result of this delay, the full potential of communications between the main loop and the mini loop is not realized. The present invention and communications structure alleviates this problem. As stated previously, the main bridge unit sits on the main loop and listens to all the messages which are transported on the media. Depending on the setting of bits in header 42 (FIG. 4), the main bridge unit copies a packet and retransmits it to the remote bridge unit.

Figure 5:
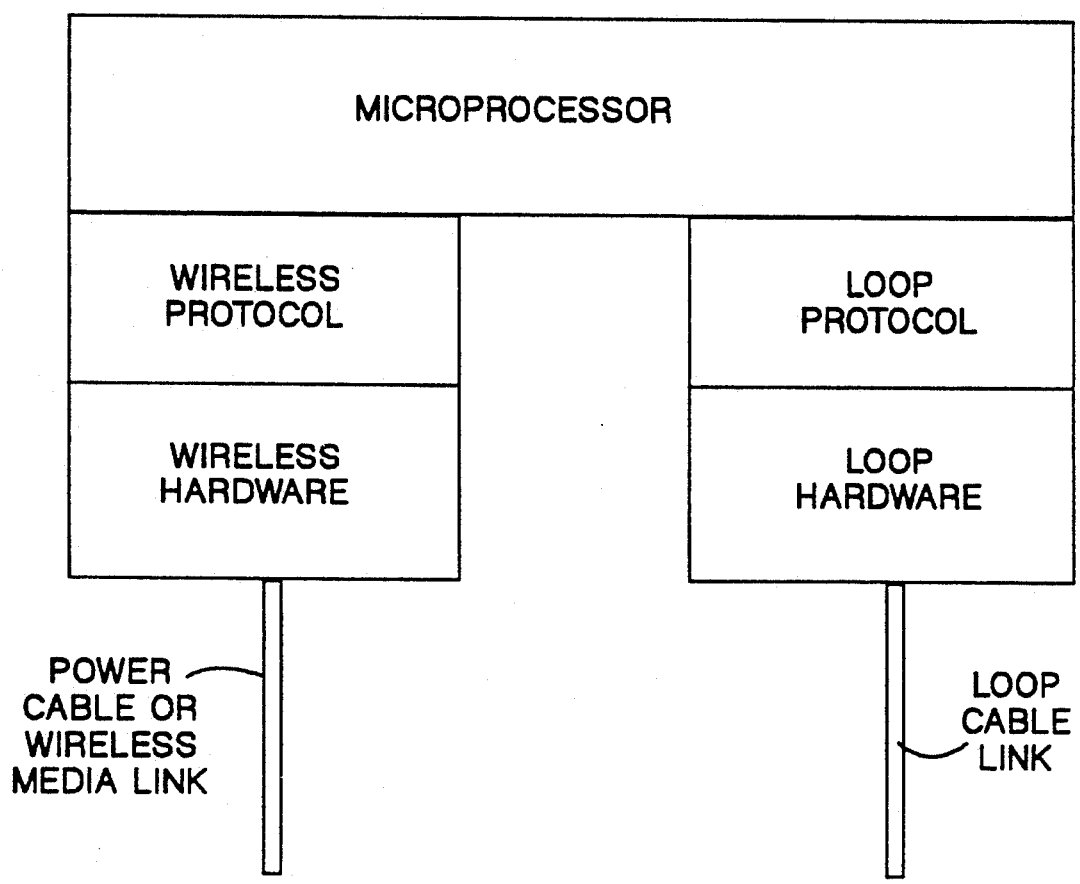
FIG. 5 shows a block diagram representation of the bridge structure.

FIG. 5 shows a functional block diagram for the bridge unit. The bridge unit includes a microprocessor which controls the device, a wireless protocol section and a wireless hardware section. The wireless hardware section is connected to the power cable or wireless media link. With reference to FIGS. 1, 2 and 3, the wireless hardware section and the wireless protocol section would be connected to the network (wireless or power distribution system) which interconnects the main loop to the remote loops. The wireless hardware includes component, circuitry, etc., which is used to attach the bridge to the wireless or power cable distribution system of the interconnecting network. The wireless protocol section practices the protocol which is used to transmit information through the power line or in the case of infrared communication, the infrared link. Since device and protocol for transmitting data either through the Power line or on a radio frequency or infrared link is well known further discussion of the wireless hardware and wireless protocol sections will not be given here. Suffice it to say that transmissions from the interconnecting networks are processed according to the wireless protocol and hardware and presented to the microprocessor. The microprocessor is also connected to a loop protocol section and a loop hardware section. The loop hardware section is coupled to the loop cable link. As with the wireless section of the bridge, the loop protocol section practices the protocol which is necessary to transmit data on the loop and the hardware includes conventional circuitry which forwards or receives the loop protocol data onto the loop cable link. As previously described, the SDLC protocol is the protocol that is used on the loop section of the communications network described in FIG. 1, 2 and 3.

Figure 8:
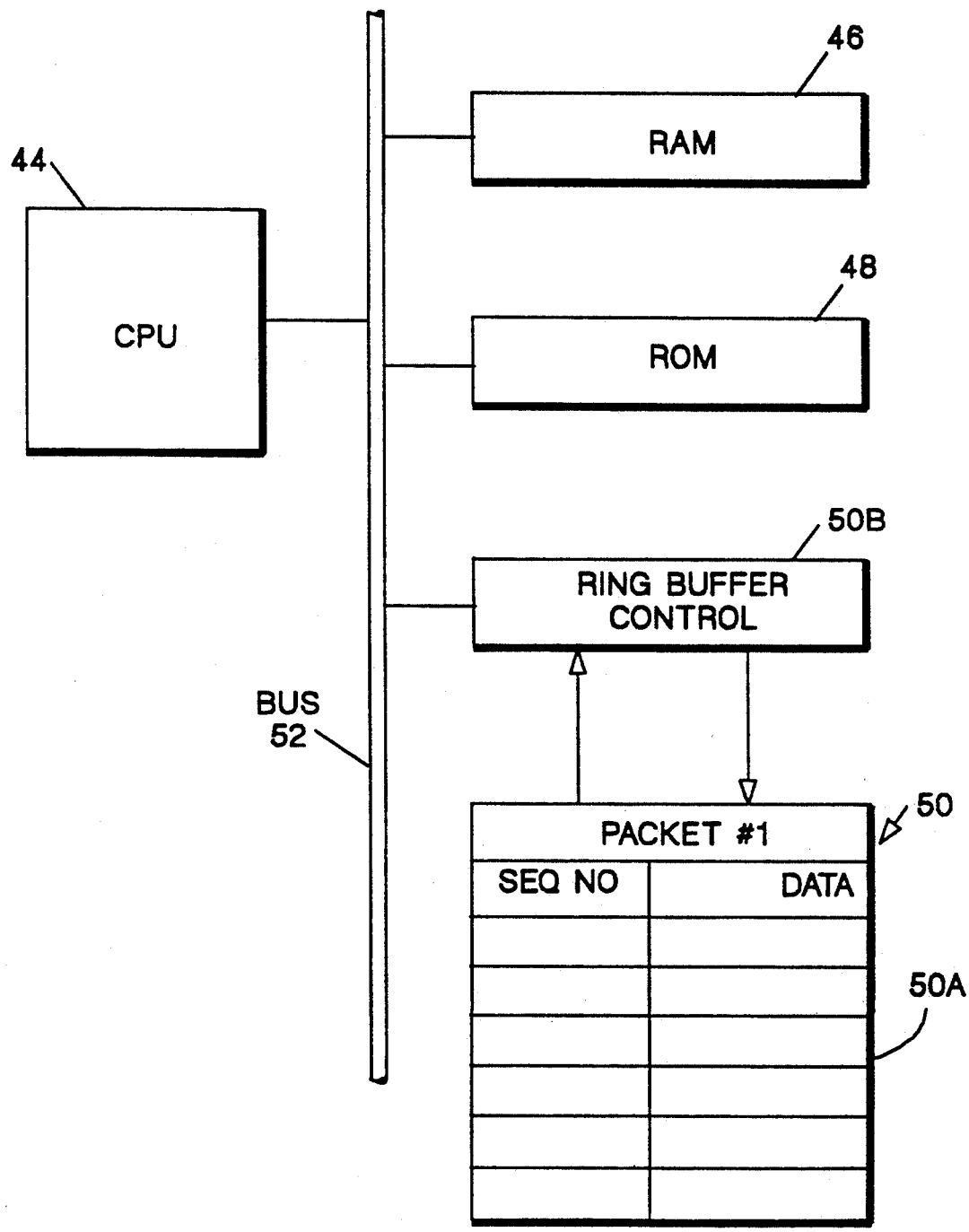
FIG. 8 shows a block diagram of the main bridge unit (MBU).

Turning to FIG. 8 for the moment, there is shown a more detailed structure of the microprocessor. The structure in FIG. 8 is the structure which is used in the main bridge unit attached to the main store loop. The configuration of the remote bridge units are identical except that the ring buffer and the control is optional. As will be described subsequently, the ring buffer, in the main bridge unit, is one of the recovery devices used to recover packets which are lost and not delivered to terminals. The microprocessor includes CPU 44, RAM 46, ROM 48 and ring buffer means 50. The RAM, ROM and ring buffer means 50 is coupled through internal bus 52 to the CPU 44. The microprocessor is a stored program microprocessor with control information stored in the ROM and applications program (details to be given hereinafter) is stored in the RAM. The ring buffer means 50 includes a ring buffer 50A and a ring buffer control 50B. The ring buffer 50 stores selected packets of data which are generated and distributed by the store controller into the buffer. The buffer is structured so that each packet is stored with a sequence number and associated data. Therefore, by comparing a given sequence number with the sequence numbers in the ring buffer, the presence or absence of a packet can be easily determined.

It should also be noted that control information for routing through the network is added by the protocol hardware of the controller before the information is placed on the communications media. As discussed previously, the present invention provides a device and procedure which allows lost packets in the network to be provided in a relatively short time and very efficiently. The microprocessor in the MBU is programmed so as to retransmit from the ring buffer 50A a packet which was not delivered to a unit and is contained within the ring buffer. Subsequent packets in the buffer are then retransmitted.

Figure 6:
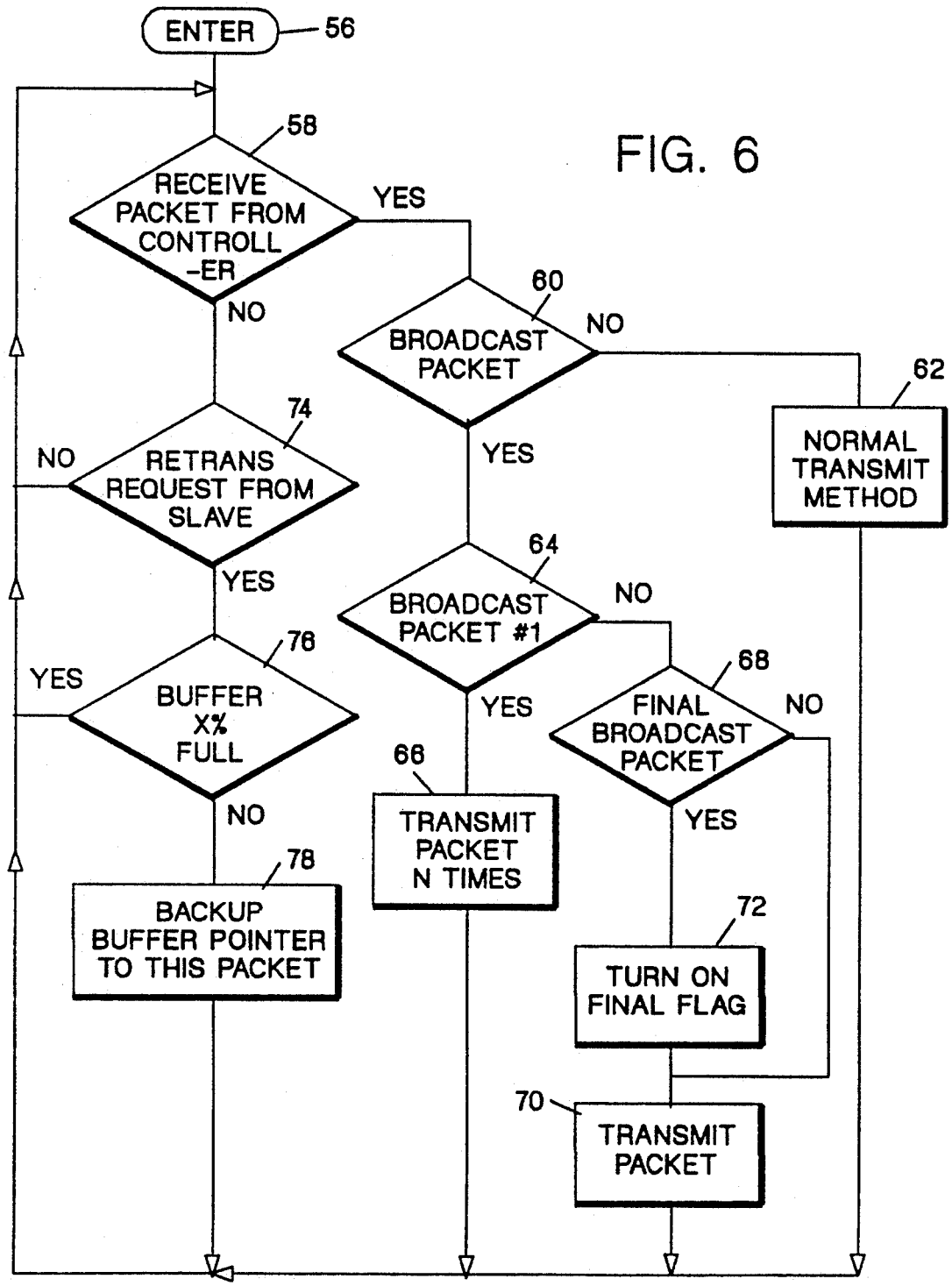
FIG. 6 shows a flow chart of the broadcast retransmission logic in the master bridge.

FIG. 6 shows a flow chart of the broadcast retransmission logic which controls the microprocessor during a retransmission procedure. It should be noted at this point that "broadcast" type packets of data transmitted from the main control unit are buffered in the ring buffer 50 (FIG. 8). As new packets arrive, the old ones are dislodged from the buffer. Preferably, the latest broadcast packets are stored in the ring buffer. The sequence number of the packet and the associated data are stored in the ring buffer. Therefore, when the main bridge unit receives a retransmission request from a slave unit, the logic of FIG. 6 forces the CPU to back up to the sequence number of the packet in the ring buffer and retransmit it over the interconnecting network.

In addition, packets following the requested packets are also transmitted. For example, if the sequence number of the retransmitted packet is N, the controller continues to transmit sequence numbers (N+1), (N+2) and so forth.

Still referring to FIG. 6, the first block in the program is an entry block labeled with numeral 56. This is a point whereat the microprocessor enters and begins to execute the program. The microprocessor then descends into block 58 where the program tests to see if it received a packet from the controller. If a packet was received, the program exit block 58 along the yes (Y) path into block 60. In block 60 the program tests to see if the message is a broadcast packet. This is done by looking at selected bits in the message. If the message is not a broadcast packet, the program exits along the no (N) path to block 62 where it uses the normal transmit method to forward the message and returns to block 58 to begin the process. However, if the message is a broadcast packet, the program exits block 60 along the Y path into block 64. In block 64, the program checks to see if this is the first broadcast packet. This is done by checking the sequence number which is in the information field of the frame format (FIG. 4). If the packet is the first packet broadcasted, the program exits along the Y path into block 66. In block 66, the first packet is transmitted N times over the interconnecting network (wireless, power line, etc.). The multiple transmission is a procedure to make sure that the remote bridge unit are made aware of the fact that the master unit is broadcasting. It is believed that multiple transmission is an effective and efficient way of waking up the remote bridge units. In the preferred embodiment of this invention, the N is equal to S. From block 66, the program loops back into block 58.

Still referring to FIG. 6, if the broadcast packet is not the first packet (block 64), the program exits along the No path into block 68. In block 68, the program checks to see if this is the final broadcast packet. This is done by examining a special flag set within the message. If it is not the last packet, the program exits block 68 along the no path, retransmits the packet (block 70) and returns to block 58. If the packet of data (block 68) is the final or last packet, the program exits along the yes path into block 72 where it turns on the final flag in the message and descends into transmit block 70 along the path previously described.

Still referring to FIG. 6, if in block 58 the program checks that a packet is not received from the controller, then the program exits along the no path into block 74. In block 74, the program checks to see if the message is a retransmit request from a slave or remote terminal. If it is not, the program exits along the no path and back into block 58. If, in block 74, the check shows that it is a retransmission request from the slave, the program exits along the yes path into block 76. In block 76, the program checks to see if the ring buffer (FIG. 8) is X percent full. If it is, the program exits along the yes path and returns to block 58. In the preferred embodiment of this invention, X is made equal to 90%. It should be noted that if the buffer is 90% full, the master bridge unit would not entertain rebroadcast requests from a terminal. Instead, the master bridge would continue to retransmit new messages from the controller and not honor any retransmission request. If the buffer in block 76 is not X% full, the program exits along the No path into block 78. In block 78, the program backs up the buffer pointer to the appropriate message which is lost and retransmits that message first following with sequential transmission of other messages in the buffer and second sequential messages received from the controller.

Figure 7:
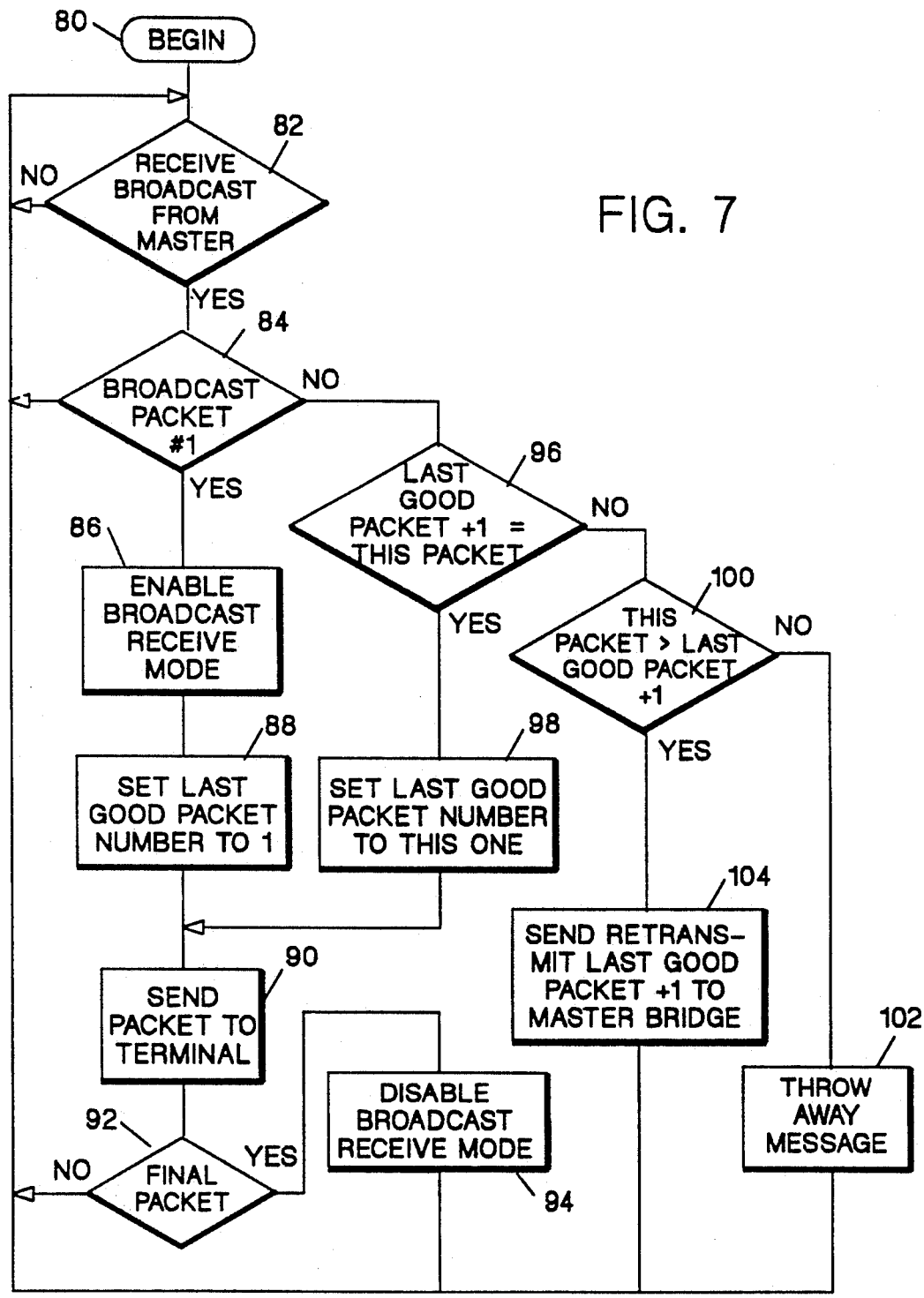
FIG. 7 shows a flow chart of the broadcast retransmission logic in the remote bridge.

FIG. 7 shows the broadcast retransmission logic for use is a remote bridge unit. The program is executed in the microprocessor positioned in the remote bridge unit. The function of the program controlled microprocessor is to receive packets from the main bridge unit, and monitor the sequence number in the received packet to make sure that the packets are received in sequential manner. In the event that a packet was not received or when received is in error, the remote bridge unit requests the main bridge unit to retransmit the damaged or missing packet. The main unit backs up to the sequence number in the ring buffer and retransmits sequential packets beginning with the missing packet.

The broadcast retransmit logic in the remote bridge unit (FIG. 7) has an entry block identified by numeral 80. This is the entry point into the program. From block 80, the program descends into block 82. In block 82, the program checks to see if the packet is a broadcast packet from the main (master) bridge unit. If it is not, the program exits along the N path and loops back to block 82. If the packet is a broadcast packet, the program exits block 82 along the yes path into block 84. In block 84 the program checks to see if this is the first broadcast packet. This is done by examining the sequence number in the received packet. If it is, the program exits along the yes path into block 86. In block 86 the program enables the broadcast receive mode. With the broadcast receive mode enabled, the program descends into block 88. In block 88, the program sets the last good packet received number to 1. Stated another way, the program keeps a record that this is the first good packet received. The program then descends into block 90. In block 90 the program sends the good block to the attached terminal and descends into block 92. In block 92 the program checks to see if this is the final packet. If it is not the final packet, the program exits along the No path back to block 82, repeating the process previously described. With reference to packet 92, if this is a final block, the program exits along the Y path into block 94. In block 94, the program disables the broadcast receive mode and branches back to block 82.

Still referring to FIG. 7 and to block 84 in particular, if in block 84 the re ed packet is not broadcast packet #1, the program exits along the No path into block 96. In block 96, the program checks to see if the sequence number of the last good packet plus 1 is equal to the sequence number of the presently received packet. If it is, the program exits along the yes path into block 98. In block 98, the program sets the sequence number of last good packet number to the value of the sequence number in this packet and descends into block 90 to repeat steps previously described. If in block 96, the test result is negative, the program exits along the No path into block 100. In block 100, the program tests to see if the sequence number of this packet is greater than the sequence number of the last good packet plus 1. If it is not, the program exits along the no path and enters into block 102. In block 102, the program throws away the packet because it would have already received the packet of data. If in block 100, the test result is yes, the program exits along the yes path into block 104. In block 104, the program sends a retransmit message to the main bridge unit with the block number set to the sequence number of the last good packet plus one in the information field of the retransmit message. The main bridge unit, on receiving this message, backs up in the ring buffer to the packet number matching the packet number in the retransmit message and begins retransmission of that packet plus subsequent packets to the remote bridge unit.

OPERATION

The scheme described above substantially improves throughput on multiple packet broadcast messages between the master node and many remote or slave nodes communicating over any type of media. The scheme requires that the slave or remote nodes recognize when a packet has been received in error or not received at all or when a packet has been correctly received. The scheme requires the addition of a two-byte control header to the front of each SDLC data packet. The header contains the broadcast message identifier, sequence number, and a flag to mark the final packet. Also, the master node must have sufficient buffer space to keep old broadcast packets to comply with specific retransmission requests from the slave nodes. Based upon empirical experiments, it has been determined that the buffer space for about four packets is sufficient.

The main bridge unit (master node) begins the process by transmitting the packets to the remote (slave) nodes. The master node transmits the first packet several times, the middle packets once each, and the final packet several times. The master node will also mark the final packet with a special flag in the header portion of the packet to indicate this is the final packet. The slave nodes initially may not be in a mode to receive the broadcast packet. Therefore, the multiple transmission of the initial packet is a method of waking up the slave node to accept the broadcast packet. When a multiple broadcast packet message with the first packet numbers is correctly received at a slave node, the slave node goes into receive broadcast mode and sets the last correctly received packet number to this packet number. While in the receive broadcast mode, when a slave node receives a multiple packet broadcast message, it always expects to receive a packet whose packet number is one greater than the last correctly received packet. If a slave node receives a packet that has a packet number lower than or equal to the last correctly received packet, it throws away the packet. If a slave node receives a packet that has a higher sequence number, than the last correctly received packet plus 1, the slave then transmits a special retransmit message back to the master node. The packet can be then discarded or saved. FIG. 7 shows the implementation for discarding the packet. This special message contains the packet number of the missed packet. The master node then backs up in its buffer space to the missed packet and continues the broadcast from that point. If the master node transmit buffer gets excessively full, say more than 90% full, this broadcast retransmission capability is temporarily suspended until the transmit buffer empties down to a safe level. When a slave node receives a broadcast packet with a final packet flag on, it terminates receive broadcast mode.

Several benefits and advantages enure to the user of the present invention. In the first instance, the memory requirements for the bridges are significantly reduced. This is so because the buffer in the main bridge does not have to store the entire block size that the controller transmits on the store loop and the remote bridge unit need not store the entire block of data since the main bridge unit backs up to a lost packet and retransmits all packets thereafter. The block of data referred to here contains many packets.

In addition, the device and technique described are well suited for use with stores prewired with looped transmission system such as the IBM store loop. By retaining the most recent packets of transmitted messages in a ring buffer on the main loop and retransmitting sequential packets if a retransmit packet message is received from a remote bridge unit, the entire 250K byte or more block of data containing many packets which the 4680 operating system is capable of transmitting is not required to be transmitted over the interconnecting network. The performance improvement is significant since the interconnecting network between the main loop and the mini loop is susceptible to errors. Sending fewer packets is less likely to result in an error condition than sending the huge main block which the controller would normally transmit.

While the invention has been particularly shown and described with reference to the preferred embodiments thereof, it will be understood by those skilled in the art that various changes in form and details may be made therein without departing from the spirit and scope of the invention.

Having thus described our invention, what we claim as new, and desire to secure by Letters patent, is:

1. A distributed data processing system comprising:
   a serial communications media interconnecting a controller and at least one terminal device;
   a first means operatively coupled to said serial communications media; said first means monitoring packets of data on the serial communications media and storing selected ones of said packets of data;
   at least one transmission link for transmitting information coupled to the first means;
   at least one remote terminal for communicating with the controller; and
   a second means interconnecting the at least one transmission link and the at least one remote terminal; said second means monitoring data packets received from said at least one transmission link and on detecting a missing or defective packet forwarding to the first means a retransmit message which causes the first means to retransmit the missing or defective packet followed by sequential transmission of other packets.

2. The distributed data processing system of claim 1 wherein the first means includes a ring buffer which stores a selective number of data packets transmitted from the controller.

3. The distributed data processing system of claim 1 wherein the at least one transmission link includes a wireless communications network.

4. The distributed data processing system of claim 1 wherein the at least one transmission link includes an electrical power distribution network.

5. In a computer network having different groups of computers coupled by separate homogeneous communications media and at least one nonhomogeneous communications network interconnecting the separately coupled groups of computers; an apparatus for facilitating transmission of packets between the computer comprising:
   as first means coupled to a first group of the different groups of computers and the non-homogeneous communications network; said first means monitoring packet on one of the separate communications media and storing selective ones of said packets; and a second means coupled to the non-homogeneous network and another one of the different groups of computers; said second means monitoring packets received from the non-homogeneous network and periodically issuing to said first means a "retransmit" message that causes the first means to discontinue sequential transmission and begin retransmission of a previously transmitted packet identified in the "retransmit" message and thereafter transmitting packets sequentially.

6. A bridge for use in a distributed data processing system having a plurality of independent networks with each network formed from a plurality of terminal units and separate loop communications media for interconnecting the terminal units said bridge comprising:

first means for monitoring data packets circulating on one of the plurality of loop communications media;

second means coupled to the first means for storing selected ones of the data packets; and third means for transmitting data packets sequentially from the second means to another one of the loop communications media, said third means responsive to a "retransmit" message generated on said another one of the loop communications media to stop sequential transmissions from the second means and to restart sequential transmission of data packets beginning at an address in the second means identified in the retransmit message.

7. In a distributed data processing system having a plurality of independent networks with each network formed from terminals interconnected by separate communications media, a bridge for interconnecting the terminals comprising:

a storage means for storing packets of data;

a controller for monitoring data on one of said separate communications media, selecting packets to be stored in the storage means, transmitting packets sequentially from the storage means and on receiving a retransmit request message from another of separate communications media, discontinue sequential transmission of the packet and begin retransmission at a packet whose identify is included in the retransmit request message and thereafter continue sequential transmission.

8. A point of sale (POS) communications system comprising:

a serial communication network interconnecting at least one POS terminal and at least one store controller;

at least one remote communications network coupled to at least one POS terminal;

an interconnecting network;

a first means connected to the serial communications network and the interconnecting network; said first means monitoring data packets on the serial communications network and storing data packets, some of which are retransmitted onto the interconnecting network; and second means coupled to the at least one remote communications network and the interconnecting network; said second means monitoring packets received from the interconnecting network and on not receiving a packet or receiving a packet having an error issuing a retransmit request message to said first means whereupon the first means stops sequential transmission and retransmits packets sequentially beginning at an address in the retransmit request message to said second means.

9. The POS communications system of claim 8 wherein the interconnecting network includes a power distribution system.

10. The POS communication system of claim 8 wherein the interconnecting network includes a wireless communications system.

* * * * *